(12) United States Patent
van Gogh et al.

(10) Patent No.: US 8,782,595 B1
(45) Date of Patent: Jul. 15, 2014

(54) SYSTEMS AND METHODS FOR RULE BASED META-PROGRAMMING OF ACTIONS FOR RULE BASED BUILD SYSTEMS

(75) Inventors: Jeffrey van Gogh, Redmond, WA (US); Ronald Aaron Braunstein, Bellevue, WA (US); Stephen F. Yegge, Kirkland, WA (US); Michael Forster, Munich (DE); Bruce Chandler Carruth, Santa Clara, CA (US); Manuel Victor Klimek, Ottobrunn (DE); Ulf Adams, Munich (DE)

(73) Assignee: GOOGLE Inc., Mountain View, CA (US)

( * ) Notice: Subject to any disclaimer, the term of this patent is extended or adjusted under 35 U.S.C. 154(b) by 225 days.

(21) Appl. No.: 13/267,386

(22) Filed: Oct. 6, 2011

(51) Int. Cl.
*G06F 9/44* (2006.01)

(52) U.S. Cl.
USPC ........... 717/100; 717/101; 717/102; 717/103; 717/104; 717/105; 717/108; 717/114; 717/140; 717/141

(58) Field of Classification Search
None
See application file for complete search history.

(56) References Cited

U.S. PATENT DOCUMENTS

| | | | |
|---|---|---|---|
| 6,922,827 B2 | 7/2005 | Vasilik et al. | |
| 7,596,782 B2 | 9/2009 | Ebbo et al. | |
| 7,640,533 B1 * | 12/2009 | Lottero et al. | 717/108 |
| 7,802,228 B2 * | 9/2010 | Madkour et al. | 717/103 |
| 7,917,888 B2 * | 3/2011 | Chong et al. | 717/102 |
| 2007/0011668 A1 * | 1/2007 | Wholey et al. | 717/151 |
| 2007/0157155 A1 * | 7/2007 | Peters | 717/100 |
| 2011/0145748 A1 * | 6/2011 | Farver et al. | 715/771 |

* cited by examiner

*Primary Examiner* — Don Wong
*Assistant Examiner* — Roberto E Luna
(74) *Attorney, Agent, or Firm* — Birch, Stewart, Kolasch & Birch, LLP (57) ABSTRACT

A build system and method, including receiving attribute rules and new rules, wherein the attribute rules correspond to one or more predefined default actions of the build system, wherein the new rules specify new actions that are to be added to the build system. A graph is generated to include files specified as attributes in the attributes rules and the one or more predefined default actions that correspond to the attributes rules. A request to enable at least one of the new rules is received. Action listener rules are received, wherein the action listener rules indicate default actions and corresponding new rules of the one or more new rules. The graph is checked for default actions that are indicated in the action listener rules. Additional actions are added to the graph for new rules based on the default actions indicated in the action listener rules.

18 Claims, 6 Drawing Sheets

```
action_listener(name = "code_analyzer",
  actions = ["Javac", "CppCompile"],                        504
  extra_actions = [ ":code_analyzer_actionV1",
                    ":code_analyzer_actionV2" ])

extra_action(name = "code_analyzer_actionV1",
  max_build_version = "2011.04.07",
  tools = [ "//java/com/devtools/code/lang/java:BuildJavaBuilder" ],    506
  out_templates = ["%{name}.cr.sstable", "%{name}.fr.sstable"],
  cmd = "$(location //java/com/devtools/code/" +
        "lang/java:BuildJavaBuilder) $(EXTRA_ACTION_INFO) $(OUT_TEMPLATES)")

extra_action(name = "code_analyzer_actionV2",
  min_build_version = "2011.04.08"
  tools = [ "//java/com/devtools/code/lang/java:BuildJavaBuilder" ],    508
  out_templates = ["%{name}.fr.sstable"],
  message = "code_analyzer $(RULE)...",
  cmd = "$(location //java/com/devtools/code/" +
        "lang/java:BuildJavaBuilder) --v2-syntax $(EXTRA_ACTION_INFO)
        $(OUT_TEMPLATES)")
```

Command:                                                    502
build java/com/common/collect:collect
        experminental_action_listener = //devtools/code/Build:code_analyzer

FIG. 6

SYSTEMS AND METHODS FOR RULE BASED META-PROGRAMMING OF ACTIONS FOR RULE BASED BUILD SYSTEMS

BACKGROUND OF THE INVENTION

1. Field of the Invention

The following relates to a software build system, software build method, and computer-readable storage medium for providing added actions in the form of rules to the build system.

2. Discussion of the Related Art

Software build systems automate the production of complex software systems. Some software build systems are rule based in which rules are used to abstract away command-line instructions to perform actions by the build system. Rules are typically described in a build file. Although software build systems can be constructed to accommodate a general developer community, particular developers or development teams often desire to use additional tools to be run alongside default tools on the same rule. Conventional rule-based build systems have a fixed mapping between the rule and the actions that will be run. Conventional rule-based build systems do not support additional actions.

A possible solution to enable developers or development teams to add actions to a rule-based build system may be to modify the build system by hard coding a new action performed by an additional tool. It may also be possible to somehow trick the build system to execute a script that will run both the original tool and the additional tool. However, hard coding revisions to the build system can require extensive effort and time. The effort and time may not be practical when only a small group of developers require the additional tool. In the case of tricking the build system, there may not actually be a reliable way of tricking the build system for most actions. Also, there may be performance and scalability issues.

SUMMARY OF THE INVENTION

A build system and method in which a computer-readable medium having instructions stored thereon which are executed by the one or more processors. The one or more processors perform operations including receiving one or more attribute rules and one or more extra action rules. The one or more attribute rules correspond to one or more predefined default actions of the build system. The extra action rules specify additional actions that are to be added to the build system. The one or more processors perform operations of generating a graph including files specified as attributes in the attribute rules and the one or more predefined default actions that correspond to the attribute rules, receiving a request to enable at least one of the extra action rules, receiving action listener rules. The action listener rules indicate default actions and corresponding extra action rules of the one or more extra action rules. The one or more processors perform operations of checking the graph for default actions that are indicated in the action listener rules, adding additional actions to the graph for extra action rules based on the default actions indicated in the action listener rules.

These and other aspects are described in detail with respect to the drawings.

BRIEF DESCRIPTION OF THE DRAWINGS

The accompanying drawings constitute part of the specification. In the drawings.

DETAILED DESCRIPTION OF THE INVENTION

A build system can be implemented on a single computer, or can be implemented on distributed computers. A build system can be utilized by a single developer or a group of developers (which may be referred to as a development team). A build system can be utilized by several groups of developers. A build system can be utilized by developers that are members of development groups.

Figure 4:
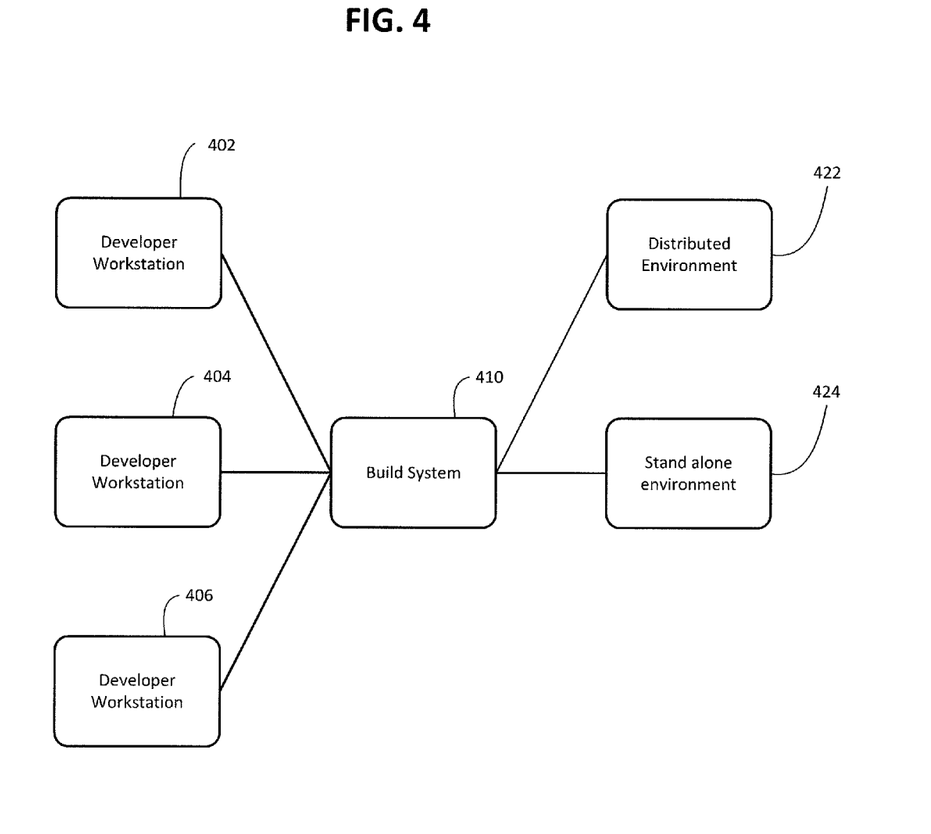
FIG. 4 is a block diagram of a system including the build system.

For simplicity, FIG. 4 shows three developer workstations 402, 404, 406 that can provide software code to a build system 410. Depending on the type of build, the build system may copy files to a remote machine, execute a build on the remote machine, and copy output files back to the user's machine. In cases where the remote machine is in a cloud system, the output files may remain in the cloud. The build system 410 may be implemented as part of a developer workstation, or work stations 402, 404, 406. The remote machine can be a distributed environment 422, or can be a stand-alone environment 424.

A rule-based build system, typically takes a build file as an input. A build file for a rule-based build system specifies build rules. Most build rules correspond to one or more actions that will be performed by the build system. The actions performed by the build system use tools that are known to the build system. Tools that are accessed by a build system include linkers and compilers. Build rules generally contain the following fields: a unique name and data. Data may consist of one or more source files, as well as dependencies between files.

Figure 3:
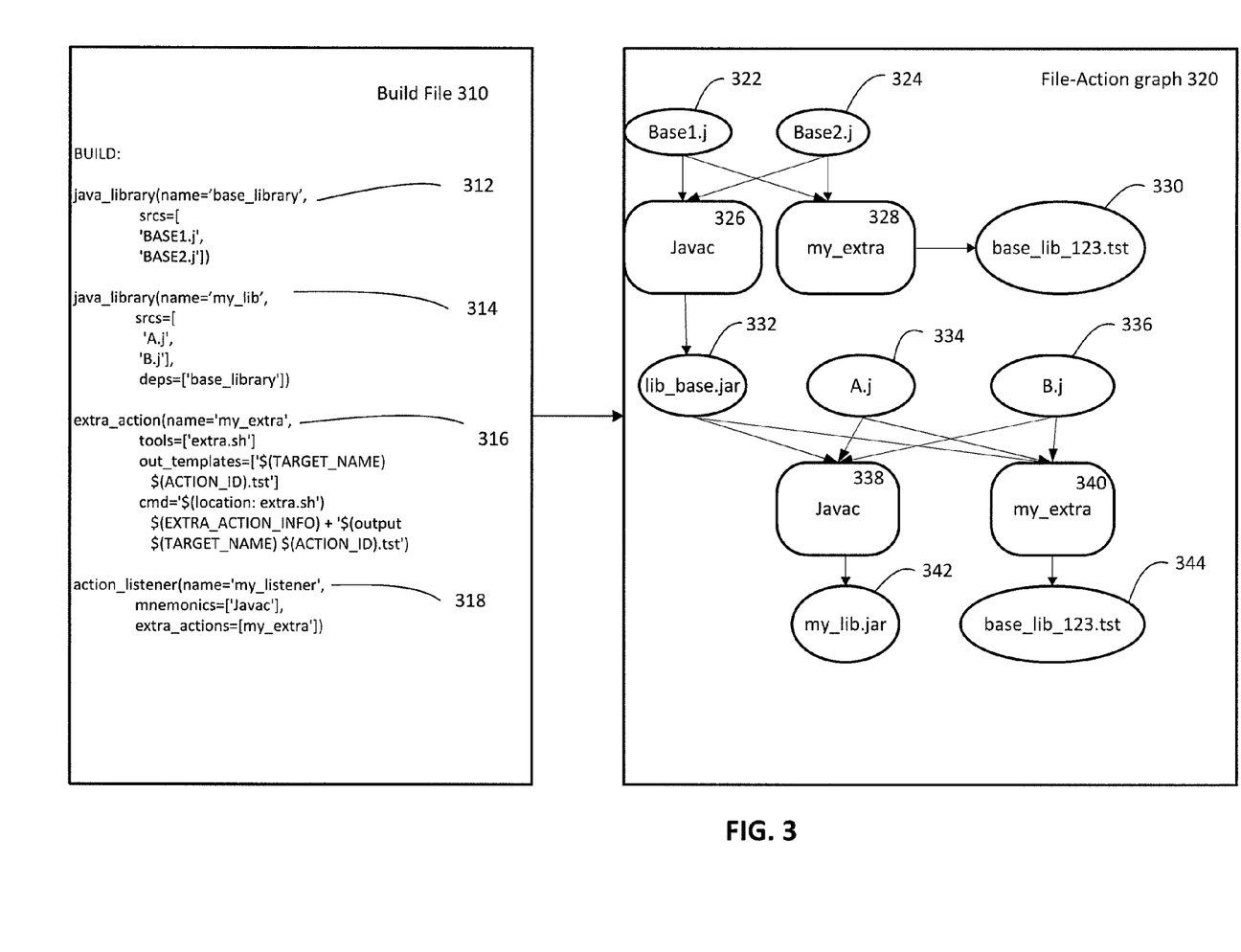
FIG. 3 is a block diagram of a build file and corresponding file-action graph having extra actions.

Example build rules are shown in FIG. 3. A build rule "java_library" 312 includes a rule name "base_library," and two source files "BASE1.j" and "BASE2.j" as data. A second build rule "java_library" 314 includes a rule name "my_lib", files "A.j" and "B.j", and a dependency indicated as a dependency between "A.j" "B.j" and "base library" (consisting of "BASE1.j" and "BASE2.j").

In an embodiment, new types of rules can be added to the build system as meta rules that enable developers to add actions to a rule-based build system. The new types of rules enable the build system to be extended to run extra actions independent of default action(s) for rules that are part of the build system. In other words, extra actions can be added without modifying the build system source code or the behavior of existing rules. The extra actions do not influence the input or output of existing actions. The extra actions run independently of the default actions such that they can be scheduled to run in parallel. For purposes of this disclosure, the extra meta rules are referred to as "extra_action" rules.

Another new type of rule that facilitates extra actions is referred to as "action_listener," which acts as a bridge. An "action_listener" rule instructs the build system which extra actions should be run for default build system actions.

As can be seen in FIG. 3, an "extra_action" rule 316 includes a rule name "my_extra", a "tools" list, an output list "out_templates", and a command line "cmd". An "action_listener" rule 318, having a name "my_listener", indicates that an action that uses the Javac tool will enable the extra action "my_extra" to run.

Figure 1:
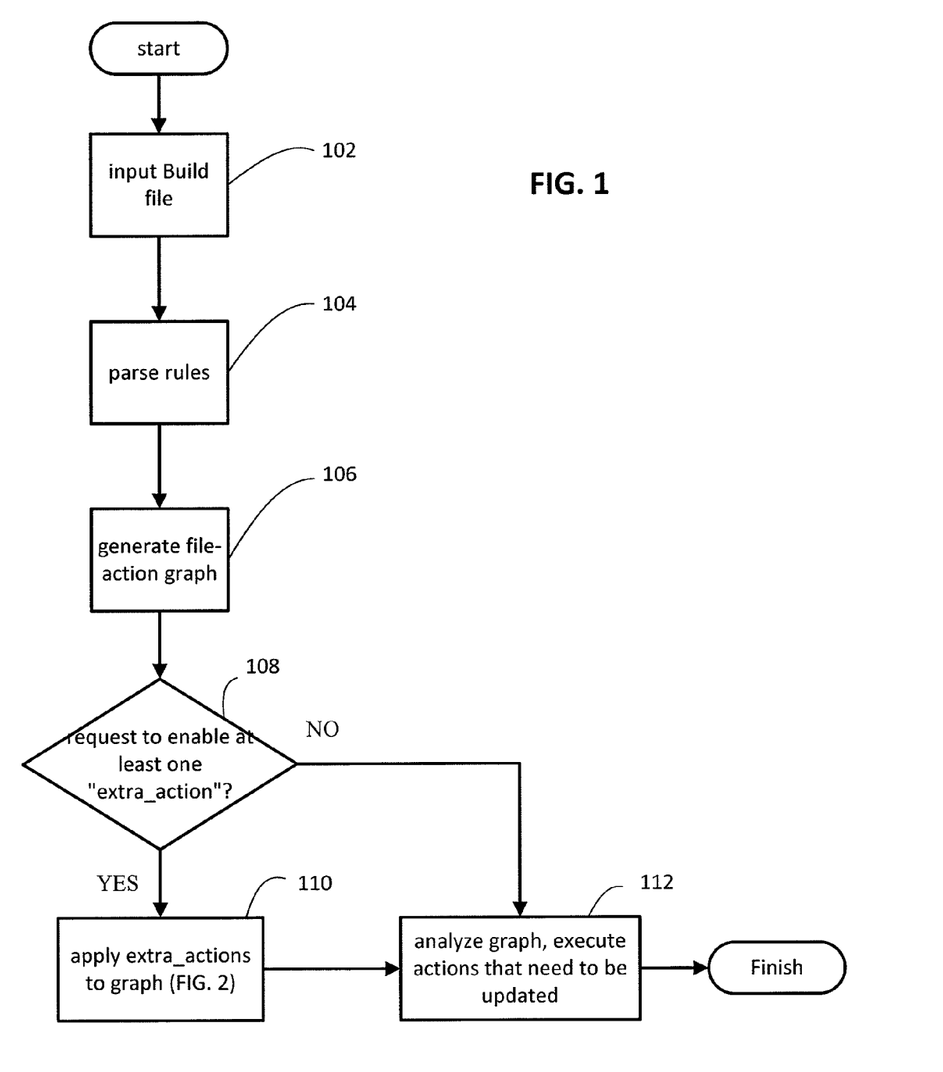
FIG. 1 is a flowchart for a method for producing a file-action graph.

The rule-based build system generates a file-action graph based on the rules in the build file. FIG. 1 is a flowchart for generating a file-action graph. At step 102, a Build file is input to the Build system 410. At step 104, the Build system 410 parses the rules in the Build file. The parsing operation includes extracting the rule names from respective rules and determining the action(s) that corresponds to the build rule. At step 106, the Build system generates a file-action graph based on the files identified in rules and corresponding actions.

FIG. 3 shows an example file-action graph 320 that is generated from the Build file 310. "Base1.j" 322 and "Base2.j" 324 represent files, and "Javac" 326 represents an action that corresponds to a rule "java_library," and in particular the rule "base_library." The action "Javac" 326 produces as an output, a file "lib-base.jar" 332. Files "A.j" 334 and "B.j" 336 are dependent on "base_library", and are generated at the same level as "lib_base.jar." "Javac" 338 is an action corresponding to rule "my_lib" "Javac" 338 produces as output "my_lib.jar" 342.

In an embodiment, extra actions are added to the file-action graph if the developer specifies the intent to run them by a command-line, such as "--experimental_action_listener=<target>" (commandline switch with --), where <target> is the name of an action_listener.

At step 108, the Build system checks if at least one command-line specifying that the developer wishes to include an extra action has been entered. When the command-line has been entered, at step 110, the Build system will apply the extra actions to the graph.

Figure 2:
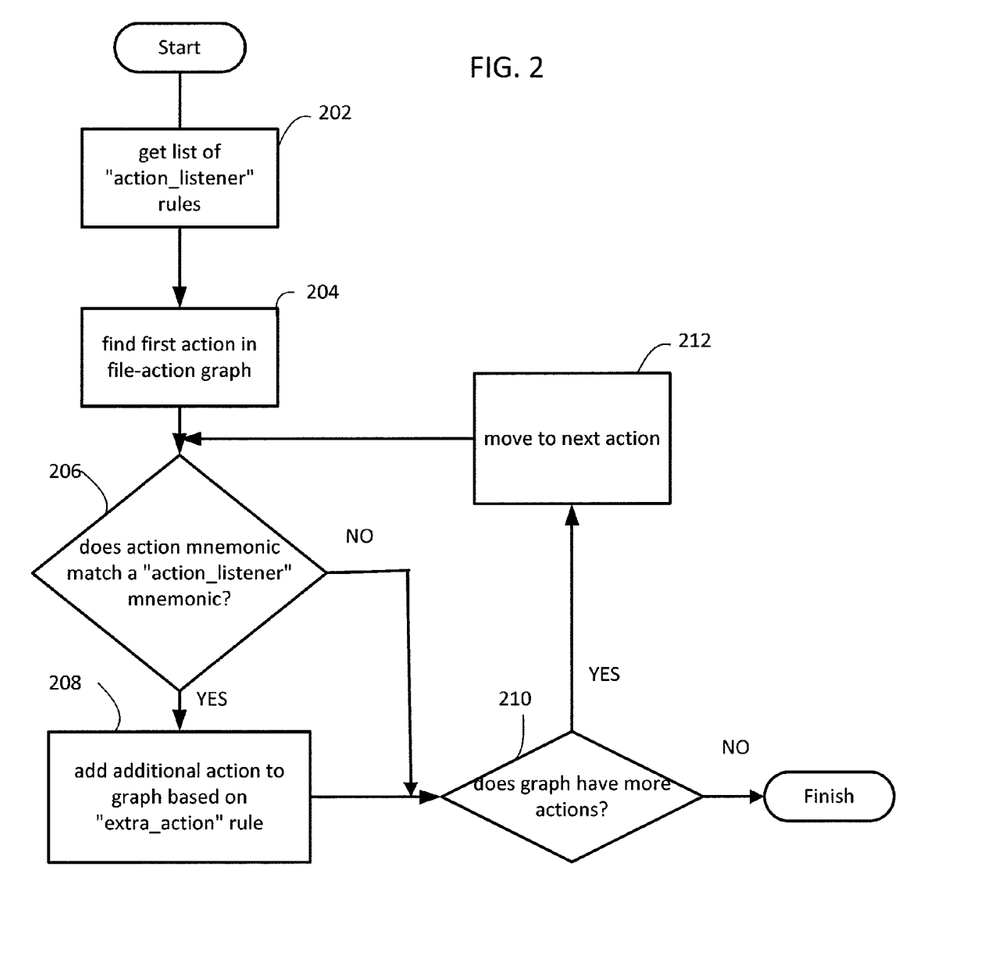
FIG. 2 is a flowchart for a method of applying extra actions to the file-action graph.

FIG. 2 is a flowchart for applying extra actions to the graph. At step 202, the Build system 410 gets a list of "action_listener" rules. In an embodiment, "action_listener" rules can be determined during parsing 104. At step 204, the Build system 410 searches the file-action graph for the first action. At step 206, the Build system checks if the action in the file-action graph matches an action specified in an action_listener. At step 208, when it is determined that there is a match with an action specified in an action_listener rule, the action corresponding to an extra_action rule is added to the graph.

Although the steps shown in FIGS. 2 and 3 are in sequence, at least some steps may be interleaved or run in parallel.

In an embodiment, when a match is found, an action is created based on the attributes for the extra_action specified in the action_listener. This action is added to the existing file-action graph. This action can include a command-line action, an in process action, or an action that contacts an external service to perform work. In an embodiment, the outputs of an extra_action are added to the list of artifacts to be built, in order to ensure the build system will process the extra_actions.

In the example shown in FIG. 3, an action "Javac" is detected as a first action. The action_listener "my_listener" includes an action "Javac." In this case, at step 208, the action "my_extra" 328 corresponding to an extra action rule is added to the file-action graph 320.

Extra_actions can be specified as a shadow of an existing internal Build system action (for example, JavaCompileAction). In such case, the shadow action receives detailed information about the original action (for example, all Java sources, classpaths, sourcejars and compiler flags). A developer can provide versions of extra_actions. An action_listener can be used to dispatch one of the versions, for example based on the version number of the build.

Also, in creating an action, the build system creates an action that writes out an extra action information file. The information file can contain structured data, such as structured data stored in a protocol buffer, describing the required information for the extra_action. In the case of a rule based extra action, the required information for an extra_action can include sources, dependencies, and a rule_class. In the case of an action shadowing 'extra_action' the required information contains information about the action it shadows, e.g., sources, classpath, jars.

In an embodiment, extra_actions extract the required information from actions they are shadowing using a method, such as ShadowActionInfo getShadowActionInfo( )

where, ShadowActionInfo is a protocol buffer that is defined as follows:

message ShadowActionInfo {
required string type=1
optional proto2.bridge.MessageSet data=2;
required string rule=3;
}

In an embodiment, this method can be overridden to allow actions to provide a custom protocol buffer that can be stored in the ShadowActionInfo data field.

An example custom protocol buffer is as follows:
message CppCompileInfo {
enum TypeId {
    MESSAGE_TYPE_ID=1776;
}
optional string command=1;
repeated string compiler_option=2;
optional string source_file=3;
optional string output_file=4;
}

At step 210, the Build system checks the file-action graph for more actions. When another action is found (YES in step 210), step 206 is repeated to determine if there is a match with an action specified in an action_listener rule. At step 208, an action corresponding to an extra_action rule is added to the file-action graph 320.

In the Example shown in FIG. 3, another extra_action" will be added to the file-action graph 320 for the second default action "Javac" 338. Extra_action 340 is added to the graph 320. The extra_action rule specifies an output "out_templates." Thus, the build system also adds output files "base_lib_123.tst" 330 and 344 to the file-action graph 320.

In the case that there are no extra_action rules in the Build file (NO in step 108), or when there are no more actions in the file-action graph (NO in decision step 210), at step 112, the Build system 410 analyzes the file-action graph 320 and executes those actions in the file-action graph 320 that need to be updated.

In an embodiment, a spawn action is created that runs the provided 'cmd' attribute. The spawn action takes as input the extra action information file, and in the case of the shadowing action, all the inputs that the action it is shadowing has. Inputs can include source files specified directly in the rule of the action that is being shadowed, as well as an output file of any dependency declared in the rule. The spawn action outputs a list of the expanded version of the entries specified in 'out_templates'.

Example

Figure 5:
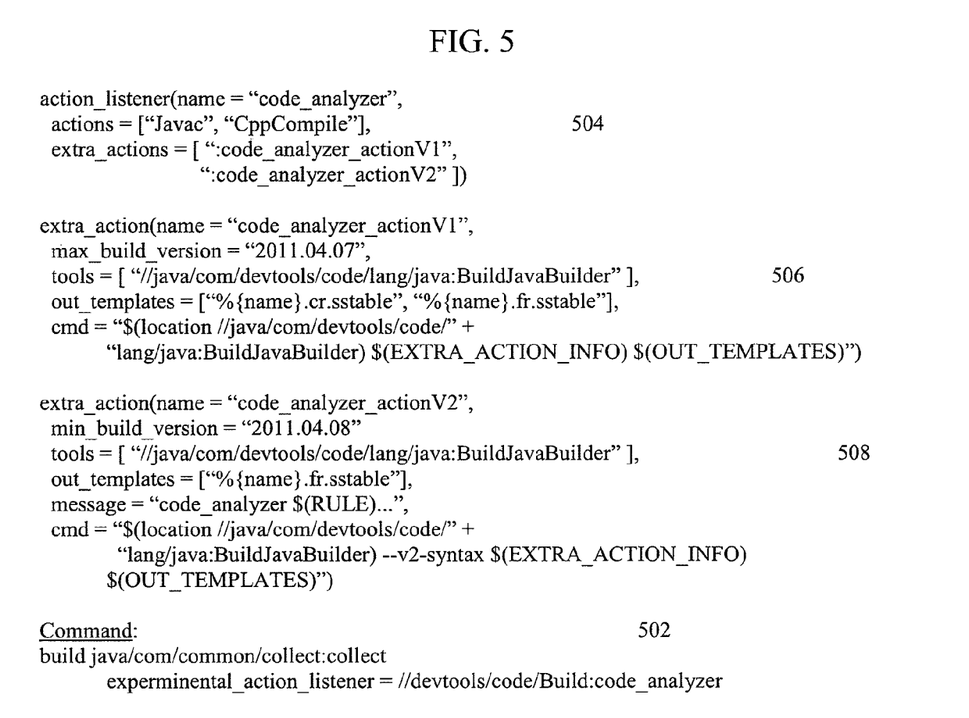
FIG. 5 shows another example of an extra action rule in a Build file.

FIG. 5 shows an example of extra_action rules for a code analyzer. In an example embodiment, a development team has developed a special code analyzer that they wish to run every time a developer performs a system build. The development team has developed a code analyzer for a variety of programming languages. The code analyzer is similar to a compiler, but does not produce runnable code. Also, the code analyzer will attempt to continue to run even as it detects errors. The code analyzer may also produce a structured description of the source code.

In the example shown in FIG. 5, two extra_action rules are provided in the build file, one for each version of a code analyzer depending on the version of the build. The build system will build binaries for a target and all of its prerequisites, as well as invoke the code analyzer to analyze the target and all of its prerequisites, when the command 502 shown in FIG. 5 is run from the command line.

When either of the actions 504 of "Javac" or "CppCompile" listed in the action_listener rule is matched to actions in a file-action graph, one of the actions specified by an extra_action rule 506, 508 will be added to the file-action graph. Depending on the selected extra_action rule, a spawn action is created that runs the "cmd" attribute, taking as an input the "EXTRA_ACTION_INFO" file, and outputs a list of an expanded version of entries in accordance with "OUT_TEMPLATES".

Computer Implementation

Figure 6:
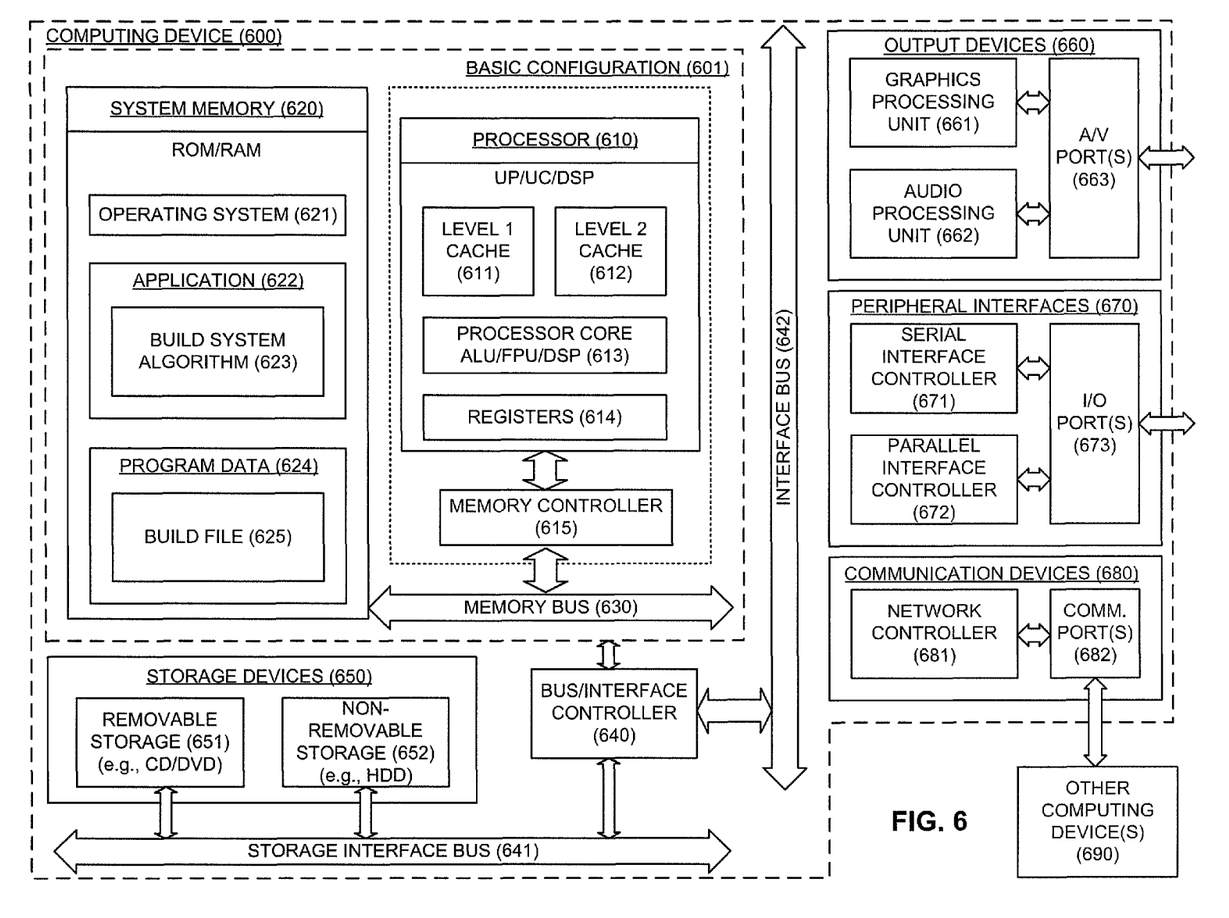
FIG. 6 is an example block diagram for a computer that can be used to implement a Build system.

FIG. 6 is a block diagram illustrating an example computing device 600 that is arranged for executing a rule-based build system in accordance with the present disclosure. In a very basic configuration 601, computing device 600 typically includes one or more processors 610 and system memory 620. A memory bus 630 can be used for communicating between the processor 610 and the system memory 620.

Depending on the desired configuration, processor 610 can be of any type including but not limited to a microprocessor (µP), a microcontroller (µC), a digital signal processor (DSP), or any combination thereof. Processor 610 can include one more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 typically includes an operating system 621, one or more applications 622, and program data 624. Application 622 includes a build system processing algorithm 623. Program Data 624 includes build file 625 that is used as an input for the build system. In some embodiments, application 622 can be arranged to operate with program data 624 on an operating system 621. This described basic configuration is illustrated in FIG. 6 by those components within dashed line 601.

Computing device 600 can have additional features or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which can be configured to communicate to various external devices such as a display or speakers via one or more A/V ports 663. Example peripheral interfaces 670 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which can be arranged to facilitate communications with one or more other computing devices 690 over a network communication via one or more communication ports 682. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for a build system, comprising:
   receiving one or more attribute rules and one or more extra action rules, wherein the one or more attribute rules correspond to one or more predefined default actions of the build system, wherein the extra action rules specify additional actions that are to be added to the build system;
   generating a graph that represents a relationship between files specified as attributes in the attributes rules and said one or more predefined default actions that correspond to the attribute rules;
   receiving a request to enable at least one of the extra action rules;
   receiving action listener rules, wherein the action listener rules indicate one or more default actions and corresponding one or more extra action rules;
   checking the graph to determine whether said graph includes a particular one of the default actions indicated in the action listener rules; and
   in response to a determination that the graph includes said particular one of the default actions, adding additional actions to the graph for one or more of the extra action rules corresponding to the particular one of the default actions.

2. The computer-implemented method of claim 1, further comprising analyzing the graph and executing those actions in the graph that need updating.

3. The computer-implemented method of claim 1, wherein the additional actions include actions that cause a software analysis tool to be run in response to a system build.

4. A computer-implemented method for a build system, comprising:
   receiving one or more attribute rules and one or more extra action rules, wherein the one or more attribute rules correspond to one or more predefined default actions of the build system, wherein the extra action rules specify additional actions that are to be added to the build system;
   generating a graph that represents a relationship between files specified as attributes in the attributes rules and said one or more predefined default actions that correspond to the attribute rules;
   receiving a request to enable at least one of the extra action rules;
   receiving action listener rules, wherein the action listener rules indicate one or more default actions and corresponding one or more extra action rules;

checking the graph to determine whether said graph includes a particular one of the default actions indicated in the action listener rules;

in response to a determination that the graph includes said particular one of the default actions, adding additional actions to the graph for one or more of the extra action rules corresponding to the particular one of the default actions; and analyzing the graph and executing those actions in the graph that need updating;

wherein a default action in an action listener rule includes a shadowing action, wherein the executing actions includes executing the additional actions by taking as input, data of a shadowing action.

5. The computer-implemented method of claim 2, wherein analyzing the graph includes creating command line actions based on attributes of extra action rules for the additional actions.

6. The computer-implemented method of claim 1, wherein the receiving the request to enable at least one of the extra action rules includes specifying a flag to the build system to enable an action listener rule.

7. A build system comprising:
one or more processors;
a computer-readable medium coupled to the one or more processors having instructions stored thereon that, when executed by the one or more processors, cause the one or more processors to perform operations comprising:
receiving one or more attribute rules and one or more extra action rules, wherein the one or more attribute rules correspond to one or more predefined default actions of the build system, wherein the extra action rules specify additional actions that are to be added to the build system;
generating a graph that represents a relationship between files specified as attributes in the attribute rules and said one or more predefined default actions that correspond to the attribute rules;
receiving a request to enable at least one of the extra action rules;
receiving action listener rules, wherein the action listener rules indicate one or more default actions and corresponding one or more extra action rules;
checking the graph to determine whether said graph includes a particular one of the default actions indicated in the action listener rules; and
in response to a determination that the graph includes said particular one of the default actions, adding additional actions to the graph for one or more of the extra action rules corresponding to the particular one of the default actions.

8. The build system of claim 7, further comprising analyzing the graph and executing those actions in the graph that need updating.

9. The build system of claim 7, wherein the additional actions include actions that cause a software analysis tool to be run in response to a system build.

10. A build system comprising:
one or more processors;
a computer-readable medium coupled to the one or more processors having instructions stored thereon that, when executed by the one or more processors, cause the one or more processors to perform operations comprising:
receiving one or more attribute rules and one or more extra action rules, wherein the one or more attribute rules correspond to one or more predefined default actions of the build system, wherein the extra action rules specify additional actions that are to be added to the build system;
generating a graph that represents a relationship between files specified as attributes in the attribute rules and said one or more predefined default actions that correspond to the attribute rules;
receiving a request to enable at least one of the extra action rules;
receiving action listener rules, wherein the action listener rules indicate one or more default actions and corresponding one or more extra action rules;
checking the graph to determine whether said graph includes a particular one of the default actions indicated in the action listener rules; and
in response to a determination that the graph includes said particular one of the default actions, adding additional actions to the graph for one or more of the extra action rules corresponding to the particular one of the default actions; and
analyzing the graph and executing those actions in the graph that need updating;
wherein a default action in an action listener rule includes a shadowing action, wherein the executing actions includes executing the additional actions by taking as input, data of a shadowing action.

11. The build system of claim 8, wherein analyzing the graph includes creating command line actions based on attributes of extra action rules for the additional actions.

12. The build system of claim 7, wherein the receiving the request to enable at least one of the extra action rules includes specifying a flag to the build system to enable an action listener rule.

13. A non-transitory computer-readable medium having embodied thereon instructions that, when executed by one or more processors, cause the one or more processors to perform computer-implemented method for a build system, the method comprising:
receiving one or more attribute rules and one or more extra action rules, wherein the one or more attribute rules correspond to one or more predefined default actions of the build system, wherein the extra action rules specify additional actions that are to be added to the build system;
generating a graph that represents a relationship between files specified as attributes in the attributes rules and said one or more predefined default actions that correspond to the attribute rules;
receiving a request to enable at least one of the extra action rules;
receiving action listener rules, wherein the action listener rules indicate one or more default actions and corresponding one or more extra action rules;
checking the graph to determine whether said graph includes a particular one of the default actions indicated in the action listener rules; and
in response to a determination that the graph includes said particular one of the default actions, adding additional actions to the graph for one or more of the extra action rules corresponding to the particular one of the default actions.

14. The medium of claim 13, the method further comprising analyzing the graph and executing those actions in the graph that need updating.

15. The medium of claim 13, wherein the additional actions include actions that cause a software analysis tool to be run in response to a system build.

16. A non-transitory computer-readable medium having embodied thereon instructions that, when executed by one or more processors, cause the one or more processors to perform computer-implemented method for a build system, the method comprising:

receiving one or more attribute rules and one or more extra action rules, wherein the one or more attribute rules correspond to one or more predefined default actions of the build system, wherein the extra action rules specify additional actions that are to be added to the build system;

generating a graph that represents a relationship between files specified as attributes in the attributes rules and said one or more predefined default actions that correspond to the attribute rules;

receiving a request to enable at least one of the extra action rules;

receiving action listener rules, wherein the action listener rules indicate one or more default actions and corresponding one or more extra action rules;

checking the graph to determine whether said graph includes a particular one of the default actions indicated in the action listener rules; and in response to a determination that the graph includes said particular one of the default actions, adding additional actions to the graph for one or more of the extra action rules corresponding to the particular one of the default actions; and analyzing the graph and executing those actions in the graph that need updating;

wherein a default action in an action listener rule includes a shadowing action, wherein the executing actions includes executing the additional actions by taking as input, data of a shadowing action.

17. The medium of claim 14, wherein analyzing the graph includes creating command line actions based on attributes of extra action rules for the additional actions.

18. The medium of claim 13, wherein the receiving the request to enable at least one of the extra action rules includes specifying a flag to the build system to enable an action listener rule.

* * * * *